US010524323B2

(12) United States Patent
Zhang

(10) Patent No.: US 10,524,323 B2
(45) Date of Patent: Dec. 31, 2019

(54) LED LAMP CONTROL SYSTEM

(71) Applicants: Self Electronics Co., Ltd., Ningbo, Zhejiang (CN); Wanjiong Lin, Ningbo, Zhejiang (CN); Self electronics USA Corporation, Norcross, GA (US)

(72) Inventor: Wentian Zhang, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 16/166,556

(22) Filed: Oct. 22, 2018

(65) Prior Publication Data

US 2019/0141810 A1 May 9, 2019

(30) Foreign Application Priority Data

Nov. 3, 2017 (CN) .......................... 2017 1 1068251

(51) Int. Cl.
*H05B 33/08* (2006.01)
(52) U.S. Cl.
CPC ..... *H05B 33/0848* (2013.01); *H05B 33/0815* (2013.01)
(58) Field of Classification Search
None
See application file for complete search history.

(56) References Cited

U.S. PATENT DOCUMENTS

| | | | | |
|---|---|---|---|---|
| 8,525,446 B2* | 9/2013 | Tikkanen | ........... | H05B 33/0815 315/291 |
| 9,093,894 B2* | 7/2015 | Liu | ......................... | G05F 1/455 |
| 2013/0234615 A1* | 9/2013 | Wu | .................... | H05B 37/0263 315/201 |
| 2014/0167728 A1* | 6/2014 | Liu | ......................... | G05F 1/455 323/318 |

* cited by examiner

*Primary Examiner* — Crystal L Hammond
(74) *Attorney, Agent, or Firm* — Wang Law Firm, Inc.

(57) ABSTRACT

An LED lamp control system comprises a power supply, a MOS transistor, a signal encoding module, a control signal input module, a signal change judging module, a MOS transistor control module, an LED lamp, a filter capacitor, and a signal decoding module, and a DC/DC converter. The signal encoding module is configured to convert the control signal output by the control signal input module into a PWM signal, and the output of the signal encoding module is connected to the gate of the MOS transistor and output a PWM signal to control the on and off of the MOS transistor, the signal decoding module is configured to convert a PWM signal loaded onto the power supply output which is connected to a MOS transistor to a dimming signal. The DC/DC converter controls the output parameters of the LED lamp according to the dimming signal. The invention makes the connection between the power supply and the LED lamp only use two wires to complete the connection between the lamp and the power supply, thereby helping to reduce the typographical difficulty of the lamp line and also facilitating the control of the structure size of the lamp.

10 Claims, 2 Drawing Sheets

LED LAMP CONTROL SYSTEM

CROSS-REFERENCE TO A RELATED APPLICATION

This application claims priority to a Chinese Patent Application No. CN 201711068251.3, filed on Nov. 3, 2017.

FIELD OF THE TECHNOLOGY

The present invention relates to lighting system, with particular emphasis on a LED lamp control system.

BACKGROUND

With the concept of "humanized lighting" deeply rooted in the hearts of the people, lighting design should create a good indoor lighting effect to meet the physiological and psychological requirements of people. The light-emitting parameters of the lamp are important factors in the lighting design, such as color temperature, brightness and other parameters, different color temperature or brightness gives different feelings, which can meet the needs of different people. Therefore, in some lamps, the above objectives are achieved by adjusting the illuminating parameters of the lamp. The existing adjustable control system of the lamp is composed of a power source, a controller and a lamp. As shown in FIG. 1, it is a circuit diagram of an existing lamp control system. The circuit diagram includes a power supply 10, a signal control system electrically connected to the power supply 10, a signal generating module for providing a control signal to the signal control system, and a LED lamp set electrically connected to the signal control system and the power supply 10. The specifications and functions of the electronic components used in the circuit diagram are well known to those skilled in the art and will not be described in detail herein. The signal generating module is configured to generate a Pulse Width Modulation (PWM) signal, that is, a square wave with alternating positive and negative signals. The LED lamp set includes a set of cool color LED lights D1-Dn and a set of warm color LED lights Dn+1-D2n. The signal control system 2 supplies power to the cool color LED lamp D1-Dn or the warm color LED lamp Dn+1-D2n according to the control signal output by the signal generating module, thereby controlling the working status of two sets of cool color and warm color LED lights. In the color temperature adjustable control system, it is necessary to use a control line including two power lines, one for controlling the working state of the cool color LED lamps D1-Dn, which requires the overall cost of the lamp to be relatively high, and also it increases the difficulty of typography of the lighting lines, and is also not conducive to the control of the size of the lighting structure.

SUMMARY OF THE INVENTION

Therefore, the present invention provides a LED lamp control system that can reduce transmission and control lines to solve the above problem.

An LED lamp control system comprises a power supply having a first power supply output terminal and a second power supply output terminal, and a MOS transistor electrically connected to one of the first and second power supply output terminals, a signal encoding module for controlling the on and off of the MOS transistor, a control signal input module electrically connected to the signal encoding module, and a signal change judging module electrically connected to the control signal input module, a MOS transistor control module electrically connected to the MOS transistor, an LED lamp electrically connected to the power supply and having a first lamp input end and a second lamp input end, and a filter capacitor electrically connected to the first lamp input end and the second lamp input end, a signal decoding module electrically connected to the LED lamp, and a DC/DC converter controlled by the signal decoding module, the first and second power supply output terminals of the power supply output a rated voltage of the LED lamp, the control signal input module outputs a control signal, and the signal change judging module is configured to determine whether the currently output control signal of the control signal input module and the control signal outputted previous by the control signal input module have changed, the signal encoding module is configured to convert the current control signal output by the control signal input module into PWM signal when it is determined by the signal change judging module that the current control signal output by the control signal input module is different from the previous control signal and output the PWM signal to control the on and off of the MOS transistor to load the PWM signal onto the power supply output terminal, and the MOS transistor control module is configured to turn on the MOS transistor when the current control signal is determined by the signal change judging module that there is no change between the previous control signal and the current control signal, and the signal decoding module is electrically connected to one of the first and second power supply output terminals of the MOS transistor, and is configured to convert a PWM signal loaded on a power supply output terminal connected to the MOS transistor into a dimming signal, the DC/DC converter is configured to control the output parameters of the LED lamp according to the dimming signal.

Advantageously, the signal encoding module is a single chip microcomputer and is disposed in the power supply.

Advantageously, the signal decoding module is a single chip microcomputer and is disposed in the LED lamp.

Advantageously, the filter capacitor is electrically connected between the input end of the signal decoding module and the LED lamp.

Advantageously, the LED lamp control system further includes a diode, the anode of the diode is connected to the first power supply output terminal, and the cathode is connected to the first lamp input end.

Advantageously, the DC/DC converter includes an input end respectively electrically connected to the first and second power supply output terminals, an output end respectively electrically connected to the first and second lamp input ends, and a dimming Input end.

Advantageously, the output end of the signal decoding module is electrically connected to the dimming input end.

Advantageously, the filter capacitor is electrically connected between an input end of the signal decoding module and an input end of the DC/DC converter.

Advantageously, the dimming signal output by the signal decoding module is a constant voltage signal.

Advantageously, the dimming signal output by the signal decoding module is a PWM signal.

Compared with the prior art, since the signal encoding module and the signal decoding module can be respectively disposed in the power supply and the LED lamp, combined with the functions of the MOS transistor and the filter capacitor, the connection between the power supply and the LED lamp can complete by using only two wires, thereby helping to reduce the layout difficulty of the lamp line and also facilitating the control of the structure size of the lamp.

In addition, when the dimming signal output by the signal encoding module is a voltage or current having a certain amplitude, unfavorable light effects such as stroboscopic lighting caused by PWM signal dimming in the prior art can be avoided.

DETAILED DESCRIPTION OF THE DRAWINGS

The drawings described herein are intended to promote a further understanding of the present invention, as follows.

DESCRIPTION OF THE PREFERRED EMBODIMENTS

The present application is illustrated by way of the following detailed description based on of the accompanying drawings. It should be noted that illustration to the embodiment in this application is not intended to limit the invention.

Figure 1:
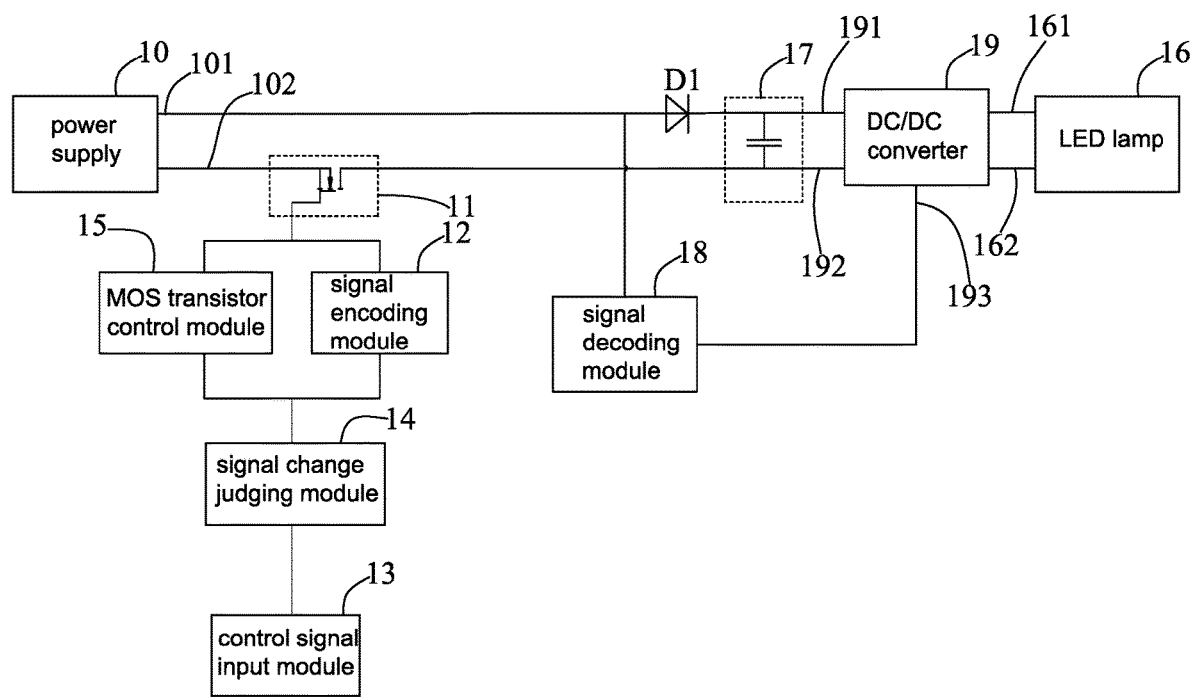
FIG. 1 is a schematic block diagram of an LED lamp control system provided by the present invention.
Figure 2:
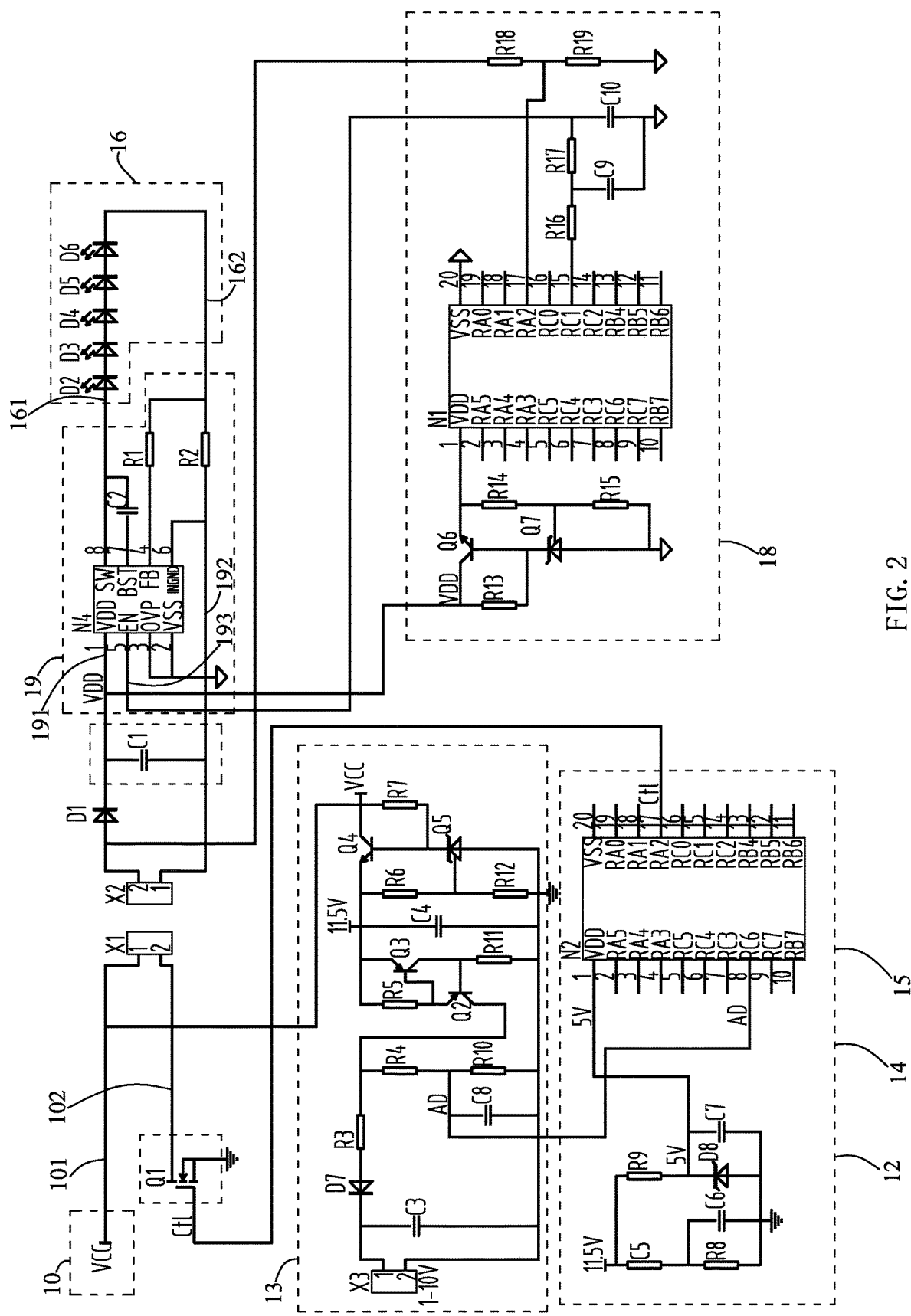
FIG. 2 is a circuit diagram of the LED lamp control system of FIG. 1.

Please refer to FIG. 1 and FIG. 2, which are schematic block diagrams and circuit diagrams of an LED lamp control system 100 according to the present invention. The LED lamp control system 100 includes a power supply 10, a MOS transistor 11 electrically connected to the power supply 10, and a signal encoding module 12 for controlling the on/off of the MOS transistor, and a control signal input module 13 electrically connected to the signal encoding modules 12, a signal change judging module 14 electrically connected to the control signal input module 13, and a MOS transistor control module 15 electrically connected to the MOS transistor 11, an LED lamp 16 electrically connected to the power supply 10, a filter capacitor 17 electrically connected to the LED lamp 16, a signal decoding module 18 electrically connected to the LED lamp 16, and a DC/DC converter 19 controlled by the signal decoding module 18. It is conceivable that the LED lamp control system 100 further includes other software and hardware function modules, such as wires, switches, etc., which are well known to those skilled in the art and will not be described in detail herein.

The power supply 10 has a first power supply output terminal 101 and a second power supply output terminal 102 and is used to provide a nominal voltage to the LED lamp 16. The power supply 10 can be any power supply that can provide power for the LED lamp 16 in the prior art, and converts the utility power into a DC constant voltage output. Therefore, the filter module, the power conversion module, and the feedback module are disposed inside. Etc., which is a technique known to those skilled in the art. The output voltage of the first and second power supply output terminal 101, 102 of the power supply 10 due to the characteristics of the LED chips (not shown in the figure) of the LED lamp 16 should be a low voltage of 36 volts, 24 volts, or 12 volts, etc.

The MOS transistor 11 may be an N-channel MOS transistor or a P-channel MOS transistor. In this embodiment, the MOS transistor 11 is an N-channel MOS transistor. A MOS transistor refers to a metal oxide semiconductor field effect transistor (MOS), which is used as a switch and is commonly used in digital electronics. However, for the structure and working principle of the MOS tube itself, it is a technique known to those skilled in the art, and will not be described in detail herein. The source and the drain of the MOS transistor 11 are connected in series on one of the first and second power output terminals 101, 102 of the power supply 10. In this embodiment, the source and the drain of the MOS transistor 11 are connected in series on the first power output terminals 101 of the power supply 10.

The control signal input module 13 should be a prior art, which may include a wired dimmer, and may also include a wireless remote controller that outputs a dimming signal of a certain format according to the user's requirement for light, such as direct 0-10 volt DC signal, WIFI signal or DALI signal, or PWM signal. It is conceivable that when a wireless remote controller is used, the power supply 10 further includes a wireless receiver. The wireless receiver receives the WIFI signal or the DALI signal and converts the WIFI signal or the DALI signal into a voltage signal that the signal encoding module 12 can process.

The signal change judging module 14 is configured to determine whether the currently output control signal of the control signal input module 13 and the control signal outputted last time by the control signal input module 13 have changed. Similarly to the signal encoding module 12, the signal change judging module 14 can also perform its function by a single chip microcomputer. Specifically, the function of the signal change judging module 14 is performed by a computer language embedded in the microcontroller. While writing the computer language, the applicant believes that those skilled in the art can use existing tools such as VB, VC, or even assembly language to write the computer language that performs the function of executing the signal change judging module 14 according to the idea of the present invention, so it will not be described in detail here. It can be understood by those skilled in the art that regardless of the format of the signal input by the control signal input module 13, it will be processed into a digital signal, such as a binary digital signal, by the processing of the single chip microcomputer. The signal change judging module 14 compares the dimming signal currently input by the control signal input module 13 with the dimming signal input last time and determines whether there is a change. Because in the actual dimming process, when the brightness value of the LED lamp 16 output is half of the total brightness value, or any ratio, the control signal input module 13 is always outputting a control signals at a certain number. When the control signal output by the control signal input module 13 changes according to the user's request, if the brightness value output by the LED lamp 16 is required to be 40% of the total brightness value, the signal change judging module 14 can judge that the current output control signal of the control signal input module 13 is different from the control signal output last time of the control signal input module 13. In order to improve the accuracy, the frequency of the comparison judgment by the signal change judging module 14 may be an arbitrary value, such as 0.1 second or less, to ensure that the change of the control signal output by the control signal input module 13 can be detected. In actual operation, when there is a change, the signal change judging module 14 may output a "1" by the single chip microcomputer, and when there is no change, a "0" is output by the single chip microcomputer.

The MOS transistor control module 15 is configured to turn on the MOS transistor 11 when the current control signal is determined by the signal change judging module 14 that there is no change between the previous control signal and the current control signal. In this embodiment, when the signal output by the signal change judging module 14 is "0", the MOS transistor control module 15 turns off the MOS transistor 11. When the current control signal output by the control signal input module 13 does not change from the previous control signal, it indicates that the user does not think that the brightness value of the LED lamp 16 need to be adjusted, and therefore, the power supply 10 has to output power all the time. Because the MOS transistor 11 is electrically connected to the first power supply output terminal 101 of the power supply 10, the MOS transistor 11 needs to be turned on to achieve the purpose of outputting power from the power supply 10. The MOS transistor control module 15 is the same as the signal change judging module 14, and can also be operated by a single chip microcomputer. Specifically, when the MOS transistor 11 needs to be turned on, the MOS transistor control module 15 outputs a high level, specifically, the high level is connected to the gate electrode of the MOS transistor 11 by a pin of the microcontroller.

The signal encoding module 12 is configured to convert the current control signal output by the control signal input module 13 into PWM signal when it is determined by the signal change judging module 14 that the current control signal output by the control signal input module 13 is different from the previous control signal. In this embodiment, when the signal output by the signal change judging module 14 is "1", the signal encoding module 12 will be activated and the current control signal output by the control signal input module 13 will be converted into a PWM signal. Generally, the dimming signal input by the control signal input module 13 is an analog signal. As in the prior art, the dimming signal is generally a DC input of 0 to 10 volts or other dimming signals, such as a WIFI signal, a DALI signal, and the like. The signal encoding module 12 can include a single chip microcomputer that converts the dimming signal described above into a PWM signal having a certain duty cycle signal. The magnitude of the duty cycle corresponds to the dimming signal itself. For example, for a DC input signal of 1 to 10 volts, when 1 volt, the duty cycle of the PWM signal is 10%, indicating that the brightness is 10% of the maximum brightness. When 0 volts, the duty cycle of the PWM signal is 0, indicating full off. When 10 volts, the duty cycle of the PWM signal is 100%, indicating the maximum brightness. For WIFI signals, DALI signals, and so on. The output of the signal encoding module 12 is connected to the gate of the MOS transistor 11 and the signal encoding module 12 outputs the PWM signal to control the on and off of the MOS transistor 11. The PWM signal with a certain duty ratio is loaded to the MOS transistor 11, and the MOS transistor 11 is turned on and off with the PWM signal, the PWM signal with a certain duty ratio can be loaded to the first power supply output terminal 101 of the power supply 10. As for the encoding method of the signal encoding module 12, the technique of converting the dimming signal into a PWM signal having a certain duty ratio should be a technique known to those skilled in the art, and will not be described in detail herein. The signal encoding module 12 should be disposed in the power supply 10 such that the power supply 10 can have only two outputs, namely the first and second power supply output terminals 101, 102.

The LED lamp 16 should also be a prior art that is electrically connected to the power supply 10 and powered by the power supply 10 to emit light. In this embodiment, the structure and working principle of the LED lamp 16 are not described in detail. The LED lamp 16 has a first lamp input end 161 and a second lamp input end 162 for electrically connecting to the first power supply output terminals 101 of the power supply 10 and the second power supply output terminals 102, respectively.

The signal decoding module 18 is configured to convert a PWM signal loaded on the first power supply output terminal 101 or the second power supply output terminal 102 of the power supply 10 into a dimming signal. In this embodiment, the MOS transistor 12 is disposed on the first power supply output terminal 101, and the first lamp input end 161 of the LED lamp 16 is electrically connected to the first power supply output terminal 101. The signal decoding module 18 is electrically connected to the first lamp input end 161 to obtain a PWM signal having a certain duty ratio flowing through the first lamp input end 161. The signal decoding module 18 can also include a single chip microcomputer and is disposed in the LED lamp 16 such that the LED lamp 16 has only two input ends, namely the first and second lamp input ends 161, 162. The dimming signal output by the signal decoding module 18 should be a signal conforming to the nominal input specification of the DC/DC converter 19. The dimming signal may be a PWM signal having certain amplitude and a certain duty ratio, or may be a magnitude signal of a voltage or current having a certain value. In the present example, the dimming signal is an amplitude signal having a certain value.

The filter capacitor 17 is electrically connected between the first and second lamp input ends 161 and 162 of the LED lamp 16 and is used to filter PWM signals loaded with a certain duty cycle on the first lamp input end 161, so as to enable the LED chip of the LED lamp 16 to receive the pure rated voltage signal. Therefore, the filter capacitor 17 is electrically connected between the input end of the signal decoding module 18 and the LED lamp 16.

The DC/DC converter 19 is a switching power supply chip in an existing technology, which can be used for step-up and step-down, and utilizes the characteristics of energy storage of capacitors and inductors to perform high frequency action of the switch through a controllable switch (MOSFET, etc.), so as to store the input electrical energy in the capacitance (sensing). When the switch is turned off, the electrical energy is released to the load to provide energy. The power or voltage capability of the output is related to the duty cycle (the ratio of the on-time of the switch to the period of the entire switch). Therefore, in the present embodiment, the structure and operation principle of the DC/DC converter 19 will not be described in detail. The DC/DC converter 19 receives the dimming signal input by the signal decoding module 18 to adjust the voltage value or current value input to the LED lamp 16, so that the output parameter of the LED lamp can be controlled. In a practical application, the DC/DC converter 19 includes an input end 191 electrically connected to the first and second power supply output terminal 101, 102, and an output end 192 electrically connected to the first and second lamp input ends 161, 162, and a dimming input end 193. An output of the signal decoding module 18 is electrically connected to the dimming input end 193. It is conceivable that the filter capacitor 17 is electrically connected between the input of the signal decoding module 18 and the input 191 of the DC/DC converter 19.

The LED lamp control system 100 further includes a diode D1 having an anode connected to the first power supply output terminal 101 of the power supply 10 and a cathode connected to the first lamp input end 161 of the LED lamp 16 to prevent a PWM signal having a certain duty ratio loaded on the first power supply output terminal 101 entering the LED lamp 16 to cause a drop in light quality.

Compared with the prior art, since the signal encoding module 12 and the signal decoding module 18 can be respectively disposed in the power supply 10 and the LED lamp 16, combined with the functions of the MOS transistor 11 and the filter capacitor 17, the connection between the power supply 10 and the LED lamp 16 can complete by using only two wires, thereby helping to reduce the layout difficulty of the lamp line and also facilitating the control of the structure size of the lamp. In addition, when the dimming signal output by the signal encoding module 12 is a voltage or current having a certain amplitude, unfavorable light effects such as stroboscopic lighting caused by PWM signal dimming in the prior art can be avoided.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

The invention claimed is:

1. An LED lamp control system, characterized in that: the LED lamp control system comprises
    a power supply having a first power supply output terminal and a second power supply output terminal, and
    a MOS transistor electrically connected to one of the first and second power supply output terminals,
    a signal encoding module for controlling the on and off of the MOS transistor,
    a control signal input module electrically connected to the signal encoding module, and
    a signal change judging module electrically connected to the control signal input module,
    a MOS transistor control module electrically connected to the MOS transistor,
    an LED lamp electrically connected to the power supply and having a first lamp input end and a second lamp input end, and
    a filter capacitor electrically connected to the first lamp input end and the second lamp input end,
    a signal decoding module electrically connected to the LED lamp, and
    a DC/DC converter controlled by the signal decoding module,
    wherein
    the first and second power supply output terminals of the power supply output a rated voltage of the LED lamp,
    the control signal input module outputs a control signal, and
    the signal change judging module is configured to determine whether the control signal currently output by the control signal input module and the control signal outputted previous by the control signal input module have changed,
    the signal encoding module is configured to convert the control signal output by the control signal input module into PWM signal when it is determined by the signal change judging module that the control signal output by the control signal input module is different from the previous control signal and output the PWM signal to control the on and off of the MOS transistor to load the PWM signal onto the power supply output terminal, and
    the MOS transistor control module is configured to turn on the MOS transistor when the control signal is determined by the signal change judging module that there is no change between the previous control signal and the control signal, and
    the signal decoding module is electrically connected to one of the first and second power supply output terminals of the MOS transistor, and is configured to convert a PWM signal loaded on a power supply output terminal connected to the MOS transistor into a dimming signal, the DC/DC converter is configured to control the output parameters of the LED lamp according to the dimming signal.

2. The LED lamp control system as claimed in claim 1, wherein the signal encoding module is a single chip microcomputer and is disposed in the power supply.

3. The LED lamp control system as claimed in claim 1, wherein the signal decoding module is a single chip microcomputer and is disposed in the LED lamp.

4. The LED lamp control system as claimed in claim 1, wherein the filter capacitor is electrically connected between the input end of the signal decoding module and the LED lamp.

5. The LED lamp control system as claimed in claim 1, wherein the LED lamp control system further includes a diode, the anode of the diode is connected to the first power supply output terminal, and the cathode is connected to the first lamp input end.

6. The LED lamp control system as claimed in claim 1, wherein the DC/DC converter includes an input end respectively electrically connected to the first and second power supply output terminals, an output end respectively electrically connected to the first and second lamp input ends, and a dimming Input end.

7. The LED lamp control system as claimed in claim 6, wherein the output end of the signal decoding module is electrically connected to the dimming input end.

8. The LED lamp control system as claimed in claim 6, wherein the filter capacitor is electrically connected between an input end of the signal decoding module and an input end of the DC/DC converter.

9. The LED lamp control system as claimed in claim 1, wherein the dimming signal output by the signal decoding module is a constant voltage signal.

10. The LED lamp control system as claimed in claim 1, wherein the dimming signal output by the signal decoding module is a PWM signal.

* * * * *